(12) United States Patent
Demenschonok et al.

(10) Patent No.: US 9,939,920 B2
(45) Date of Patent: Apr. 10, 2018

(54) KEYSET FINGERPRINT SENSOR WITH BACKLIGHT

(71) Applicant: Microsoft Technology Licensing, LLC, Redmond, WA (US)

(72) Inventors: Filipp Demenschonok, Seattle, WA (US); Timothy Francis Pier, Shoreline, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/059,517

(22) Filed: Mar. 3, 2016

(65) Prior Publication Data

US 2017/0255275 A1 Sep. 7, 2017

(51) Int. Cl.
G06F 3/02 (2006.01)
G06F 21/32 (2013.01)
G06F 1/16 (2006.01)

(52) U.S. Cl.
CPC ............ *G06F 3/021* (2013.01); *G06F 1/1662* (2013.01); *G06F 3/0202* (2013.01); *G06F 3/0219* (2013.01); *G06F 21/32* (2013.01)

(58) Field of Classification Search
None
See application file for complete search history.

(56) References Cited

U.S. PATENT DOCUMENTS

| 5,446,290 A | 8/1995 | Fujieda et al. |
| 6,061,463 A | 5/2000 | Metz |
| 7,977,759 B2 | 7/2011 | Jow |
| 8,378,508 B2 | 2/2013 | Bond et al. |
| 8,888,004 B2 | 11/2014 | Setlak et al. |
| 8,988,355 B2 | 3/2015 | Solomon et al. |
| 9,001,081 B2 | 4/2015 | Pope et al. |

(Continued)

FOREIGN PATENT DOCUMENTS

| CA | 2754314 | 3/2015 |
| CN | 1227738 | 9/1999 |

(Continued)

OTHER PUBLICATIONS

US 9,230,149, 01/2016, Benkley (withdrawn)

(Continued)

*Primary Examiner* — Duane N Taylor, Jr.

(57) ABSTRACT

Designs and techniques for keyset fingerprint sensors with backlight are described herein. In one or more implementations, a fingerprint sensor is integrated within a keyset of an input device. For instance, a key within an arrangement of keys is adapted to operate as a sensor key having an integrated fingerprint sensor. The sensor key is included within the arrangement of keys rather than being provided as a separate or external component. The sensor key includes a cover and a transmission layer covering the fingerprint sensor. A backlight integrated with the sensor key is arranged to supply light for the backlighting. The backlight is operable to selectively supply light at different times, in different colors, and/or in different sequences to illuminate a pattern on the cover and thereby provide indications indicative of sensing operations performed via the fingerprint sensor.

20 Claims, 11 Drawing Sheets

(56) References Cited

U.S. PATENT DOCUMENTS

| | | | |
|---|---|---|---|
| 9,123,485 | B2 | 9/2015 | Niu et al. |
| 9,152,838 | B2 | 10/2015 | Wickboldt et al. |
| 9,165,129 | B2 | 10/2015 | Smith |
| 9,214,293 | B2 | 12/2015 | Chen |
| 2002/0005837 | A1 | 1/2002 | Thomason et al. |
| 2002/0180585 | A1* | 12/2002 | Kim ............ G06K 9/0004 340/5.53 |
| 2005/0068337 | A1 | 3/2005 | Duarte et al. |
| 2006/0181521 | A1* | 8/2006 | Perreault ........ G06F 1/1613 345/173 |
| 2008/0079100 | A1 | 4/2008 | Manansala |
| 2009/0169071 | A1 | 7/2009 | Bond et al. |
| 2010/0245082 | A1 | 9/2010 | Stewart et al. |
| 2010/0320553 | A1 | 12/2010 | Setlak et al. |
| 2013/0265137 | A1 | 10/2013 | Nelson et al. |
| 2014/0103943 | A1 | 4/2014 | Dunlap et al. |
| 2014/0216914 | A1* | 8/2014 | Pope ............. G06F 3/044 200/600 |
| 2015/0194277 | A1 | 7/2015 | Bokma et al. |
| 2015/0270073 | A1 | 9/2015 | Yarak et al. |
| 2015/0276976 | A1 | 10/2015 | Holenarsipur et al. |

FOREIGN PATENT DOCUMENTS

| | | |
|---|---|---|
| CN | 202363330 | 8/2012 |
| CN | 104851728 | 8/2015 |
| CN | 104866226 | 8/2015 |
| CN | 204965335 | 1/2016 |
| EP | 2219136 A1 | 8/2010 |
| WO | WO-2001059558 | 8/2001 |
| WO | 2004098083 A1 | 11/2004 |
| WO | WO-2014143065 | 9/2014 |
| WO | WO-2015041459 | 3/2015 |
| WO | WO-2015072821 | 5/2015 |

OTHER PUBLICATIONS

"Francium Pro—87 key", Available at: http://deckkeyboards.com/product/francium-pro-87-key, Sep. 24, 2014, 2 pages.

"Fingerprint reader", Available at: https://www.microsoft.com/surface/en-us/accessories/surface-pro-4-type-cover-fingerprint, Oct. 16, 2015, 3 pages.

Dilger,"Apple, Inc. gets its fingerprints on advanced touch sensor, appears difficult for Android to copy", Available at: http://appleinsider.com/articles/13/08/07/apple-inc-gets-its-fingerprints-on-advanced-touch-sensor-appears-difficult-for-android-to-copy, Aug. 7, 2013, 17 pages.

Oki,"FingerPhone: Smart Interphone Integrated with a Fingerprint Sensor", In Proceedings of the ACM International Joint Conference on Pervasive and Ubiquitous Computing, Sep. 7, 2015, pp. 277-280.

Xia,"Innovations in fingerprint capture devices", In Journal of Pattern Recognition, vol. 36, Issue 2, Feb. 2003, pp. 361-369.

"International Search Report and Written Opinion", Application No. PCT/CN2016/078261, dated Jan. 6, 2017, 11 pages.

"International Search Report and Written Opinion Issued in PCT Application No. PCT/US2017/019289", dated Jun. 12, 2017, 14 Pages.

* cited by examiner

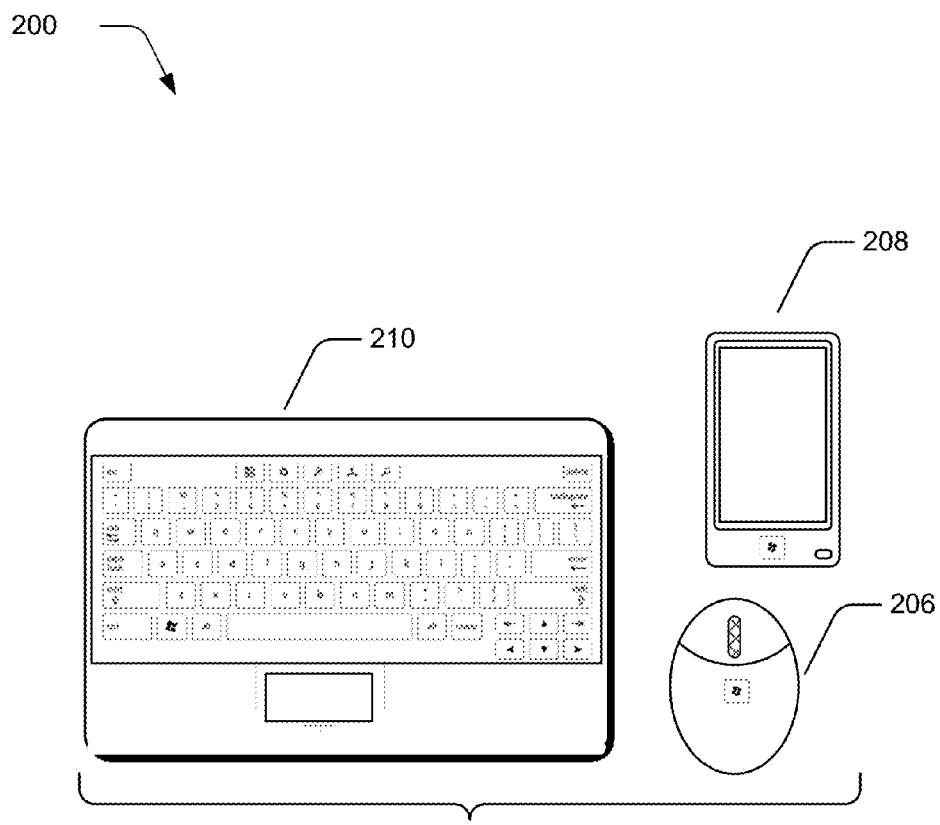
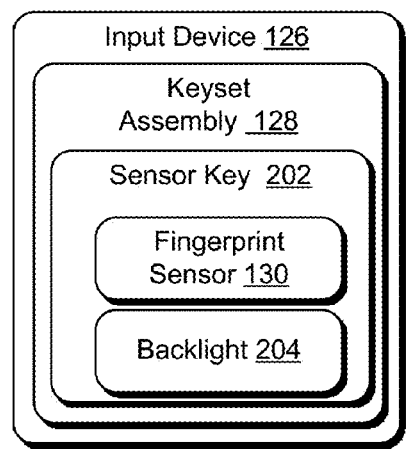

900 

902
Form a sensor key for inclusion within an arrangement of keys, the sensor key including a transmission layer covering a fingerprint sensor, a patterned cover disposed over the transmission layer and the fingerprint sensor, and a backlight configured to transmit light through the transmission layer to the patterned cover

904
Assemble an input device including the sensor key within the arrangement of keys, and control logic operable to selectively operate the backlight to provide different indications regarding operational status of the fingerprint sensor by selectively changing light that is emitted via the patterned cover

Detect status of a fingerprint sensor of a sensor key included within a keyset for an input device, the sensor key including a cover pattern that is illuminable by a backlight 1004
Direct operation of the backlight to supply light indicative of the detected status of the fingerprint sensor to illuminate the cover pattern

Fig. 10

KEYSET FINGERPRINT SENSOR WITH BACKLIGHT

BACKGROUND

A variety of kinds of computing devices have been developed to provide computing functionality to users in different settings. For example, a user may interact with a mobile phone, tablet computer, wearable device or other computing device to check email, surf the web, compose texts, interact with applications, and access other resources. The use of biometric technology to facilitate user access to their devices and/or authentication to access resources is increasing due to security demands and potential for biometric technology to make access and authentication quick and easy. Today, fingerprint sensing technology is a widely used form of biometric technology and various types of fingerprint sensors are available.

In traditional arrangements, fingerprint sensors used with some devices are provided as separate external devices, such as USB peripheral sensors. However, the external fingerprint sensors require users to keep track of and manage an additional item and carry the item along in mobile scenarios. As such, users may find the external fingerprint sensors inconvenient and may be reluctant to adopt the technology. Other devices have recently appeared having built-in fingerprint sensors, but typically the built-in fingerprint sensors are designed as additional, separate components (e.g., a dedicated sensor button or control) that take-up additional space within a device housing as well as on the exposed device surfaces. Consequently, the addition of a built-in fingerprint sensor places constraints on device size that make it difficult for developers to create thin and sleek designs that are popular with consumers.

SUMMARY

Designs and techniques for keyset fingerprint sensors with backlight are described herein. In one or more implementations, a fingerprint sensor is integrated within a keyset of an input device. For instance, a key within an arrangement of keys (e.g., "a keyset") for a keyboard is adapted to operate as a sensor key having an integrated fingerprint sensor. The sensor key is included within the arrangement of keys rather than being provided as a separate or external component. In implementations, a keycap for the sensor key is configured to include a cover and a transmission layer covering an integrated circuit die, which includes the fingerprint sensor. The transmission layer is a relatively thin layer of transparent or translucent material) that enables fingerprint sensing to occur through the keycap as well as transmission of light through the transparent layer for backlighting of the cover. A backlight integrated with the sensor key is arranged to supply light for the backlighting.

In implementations, the cover (including portions directly above the fingerprint sensor) is configured to include a pattern (e.g., a logo, icon, key label, hole pattern) formed into the cover and designed to be illuminated with light supplied by the backlight. The backlight is operable to selectively supply light at different times, in different colors, and/or in different sequences to illuminate the pattern and thereby provide indications indicative of sensing operations performed via the fingerprint sensor. By way of example and not limitation, the pattern may be illuminated in different ways to convey indications regarding operational status of the sensor (e.g., on, off, waiting), authentication status of a user, user identity, and/or availability of the fingerprint sensor in an application context (e.g., purchase transactions, authentication sequences, electronic document signing, etc.).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 depicts an example implementation of an input device of FIG. 1 in greater detail.

FIG. 9 depicts an example procedure for assembly of an input device having a sensor key in accordance with one or more implementations.

FIG. 10 depicts an example procedure for operation of a sensor key in accordance with one or more implementations.

DETAILED DESCRIPTION

Overview

Figure 1:
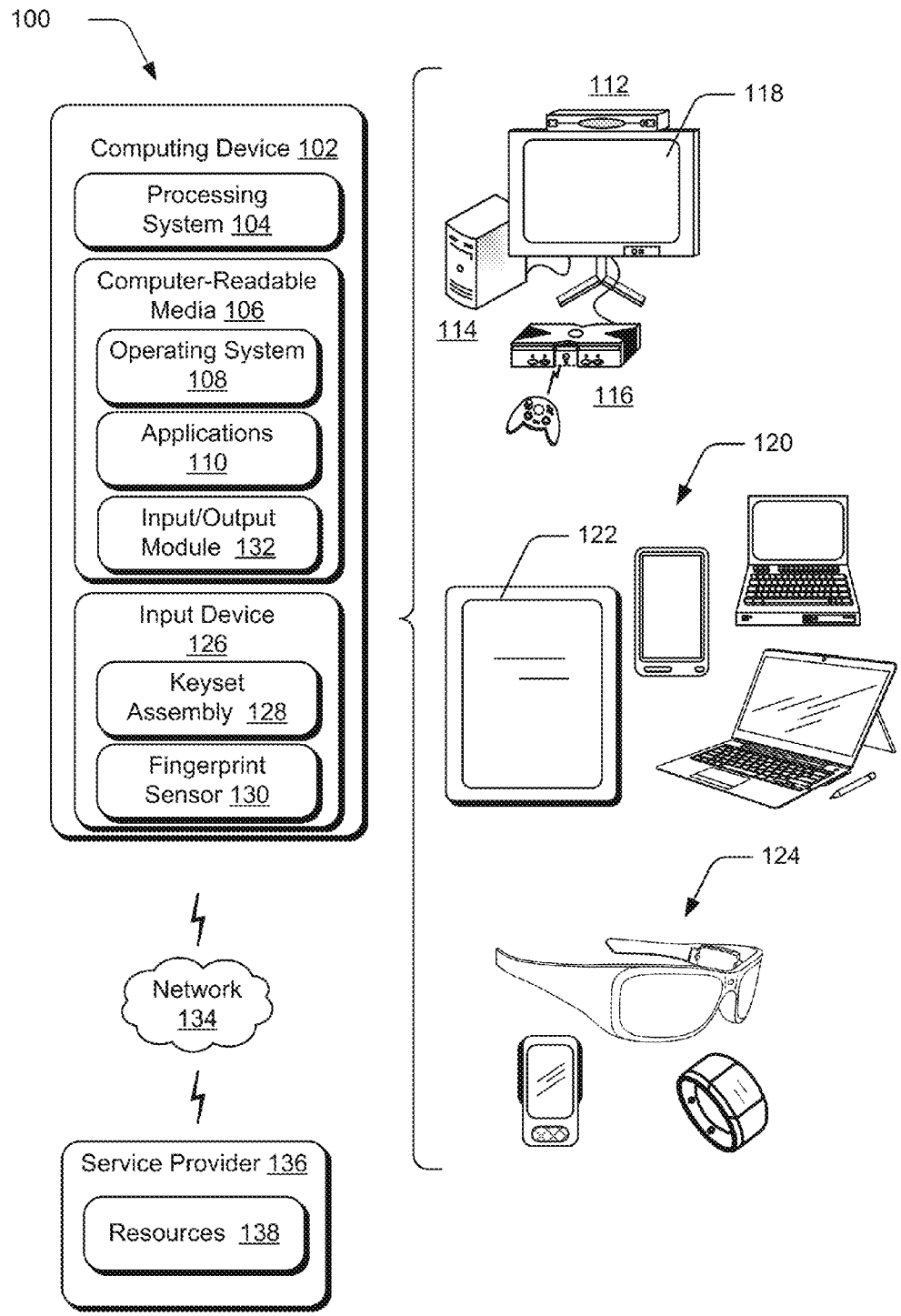
FIG. 1 is an illustration of an example operating environment that is operable to employ the magnetic detent techniques described herein in accordance with one or more implementations.

Conventional fingerprint sensors used with some devices are provided as separate external devices or built-in as additional, separate components (e.g., a dedicated sensor button or control) that take-up additional space within the device housing. As such, users may find fingerprint sensors inconvenient to use and device size is comparatively large for devices that include conventional fingerprint sensor designs.

Designs and techniques for keyset fingerprint sensors with backlight are described herein. In one or more implementations, a fingerprint sensor is integrated within a keyset of an input device. For instance, a key within an arrangement of keys (e.g., a keyset) for a keyboard is adapted to operate as a sensor key having an integrated fingerprint sensor. The sensor key is included within the arrangement of keys rather than being provided as a separate or external component. In implementations, a keycap for the sensor key is configured to include a cover and a transmission layer covering a silicon die package, which includes the fingerprint sensor. The transmission layer is a relatively thin layer of clear (or translucent) material that enables fingerprint sensing to occur through the keycap as well as transmission of light through the transparent layer for backlighting of the cover. A backlight integrated with the sensor key is arranged to supply light for the backlighting.

In implementations, the cover (including portions directly above the fingerprint sensor) is configured to include a pattern (e.g., a logo, icon, key label, hole pattern) formed into the cover and designed to be illuminated with light supplied by the backlight. The backlight is operable to selectively supply light at different times, in different colors, and/or in different sequences to illuminate the pattern and thereby provide indications indicative of sensing operations performed via the fingerprint sensor. By way of example and not limitation, the pattern may be illuminated in different ways to convey indications regarding operational status of the sensor (e.g., on, off, waiting), authentication status of a user, user identity, and/or availability of the fingerprint sensor in an application context (e.g., purchase transactions, authentication sequences, electronic document signing).

Fingerprint sensor arrangements described herein provide convenient location of a sensor key within a key arrangement for an input device. The sensor key is built into a key that is already included in the keyset and accordingly the device size can be optimized, and componentry and cost to add fingerprint sensors is reduced relative to conventional arrangements. Additionally, including a backlight as described within the sensor key design provides a mechanism to provide users with feedback regarding operation and availability of the sensor key for fingerprint sensing technology. In implementations, the same key is configured for use as a both a fingerprint sensor and as a key having other input function(s). In this case, the feedback from the backlight facilitates use of the particular key as a fingerprint sensor in some scenarios and for other input functions at other times.

In the discussion that follows, a section titled "Operating Environment" is provided that describes an example environment suitable to employ the keyset fingerprint sensor with backlight techniques described herein. Following this, a section titled "Keyset Fingerprint Sensor Key Examples" describes example techniques, devices, arrangements, and details in accordance with one or more implementations. Last, a section titled "Example System" describes example computing systems and devices that can employ keyset fingerprint sensors in accordance with one or more implementations.

Operating Environment

FIG. 1 illustrates an operating environment in accordance with one or more implementations, generally at 100. The environment 100 includes a computing device 102 having a processing system 104 with one or more processors and devices (e.g., CPUs, GPUs, microcontrollers, hardware elements, fixed logic devices, etc.), one or more computer-readable media 106, an operating system 108, and one or more applications 110 that reside on the computer-readable media and which are executable by the processing system. The processing system 104 may retrieve and execute computer-program instructions from applications 110 to provide a wide range of functionality to the computing device 102, including but not limited to gaming, office productivity, email, media management, printing, networking, web-browsing, and so forth. A variety of data and program files related to the applications 110 can also be included, examples of which include games files, office documents, multimedia files, emails, data files, web pages, user profile and/or preference data, and so forth.

The computing device 102 can be embodied as any suitable computing system and/or device such as, by way of example and not limitation, a gaming system, a desktop computer, a portable computer, a tablet or slate computer, a handheld computer such as a personal digital assistant (PDA), a cell phone, a set-top box, a wearable device (e.g., watch, band, glasses, etc.), and the like. For example, as shown in FIG. 1 the computing device 102 can be implemented as a television client device 112, a computer 114, and/or a gaming system 116 that is connected to a display device 118 to display media content. Alternatively, the computing device may be any type of portable computer, mobile phone, or portable device 120 that includes an integrated display 122. A computing device may also be configured as a wearable device 124 that is designed to be worn by, attached to, carried by, or otherwise transported by a user. Examples of wearable devices 124 depicted in FIG. 1 include glasses, a smart band or watch, and a pod device such as clip-on fitness device, media player, or tracker. Other examples of wearable devices 124 include but are not limited to a ring, an article of clothing, a glove, and a bracelet, to name a few examples. Any of the computing devices can be implemented with various components, such as one or more processors and memory devices, as well as with any combination of differing components. One example of a computing system that can represent various systems and/or devices including the computing device 102 is shown and described below in relation to FIG. 11.

The computer-readable media can include, by way of example and not limitation, all forms of volatile and non-volatile memory and/or storage media that are typically associated with a computing device. Such media can include ROM, RAM, flash memory, hard disk, removable media and the like. Computer-readable media can include both "computer-readable storage media" and "communication media," examples of which can be found in the discussion of the example computing system of FIG. 11.

The computing device 102 may include or make use of an input device 126. For example, the computing device 102 may be communicatively coupled to one or more input device 126 via any suitable wired or wireless connection. Input devices include devices integrated with the computing device 102, such as an integrated keyboard, touchpad, track pad, pointer device, a bezel or other touch operable component of a tablet or wearable device, a touch capable display, and so forth. Input devices also include external devices and removably connectable devices such as a mouse, wireless keyboard, removable keyboard/cover combination, a mobile phone, a wearable device used to control the computing device through a wireless connection, an external touchpad, and so forth. Other non-conventional configurations of an input device are also contemplated, such as a game controller, configuration to mimic a musical instrument, and so forth. Thus, the input device 126 and controls incorporated by the input device (e.g., buttons, keys, touch regions, toggles, etc.) may assume a variety of different configurations to support a variety of different functionality.

In accordance with one or more implementations described herein, an input device 126 includes a keyset assembly 128 that implements a fingerprint sensor 130. As introduced above, the fingerprint sensor 130 is integrated within a key included in an arrangement of keys (e.g., a keyset having one or more individual keys) implemented by the keyset assembly 128. For example, at least one key of an input device 126 in the form of a keyboard may be adapted to operate as a sensor key having an integrated fingerprint sensor. The sensor key is included within the arrangement of keys rather than being provided as a separate or external component. In implementations, a keycap for the sensor key is configured to include a cover and a transmission layer of transparent or translucent material covering an integrated circuit die, which provides the fingerprint sensor functionality. The sensor key may be configured in various ways, examples of which are provided in the discussion that follows. Additionally, a backlight integrated with the sensor key is arranged to supply light that is conveyed through the transmission layer for backlighting the key. In this way, patterns formed into the cover above the fingerprint sensor 130 may be selectively illuminated in dependence upon the sensors status, current interaction scenario, and/or various corresponding criteria. Details regarding these and other aspects of a keyset assembly 128 can be found in the following discussion.

The computing device 102 is further illustrated as including an input/output module 132 configured to process input signals received from the input device 126 and/or other sources. The input/output module 108 is representative of various functionality relating to processing of inputs and rendering outputs of the computing device 102. A variety of different inputs may be processed by the input/output module 132, such as inputs relating to operation of controls of the input device 126, keys of a virtual keyboard, identification of gestures through touchscreen functionality, and so forth. Responsive to the inputs, the input/output module 132 causes corresponding operations to be performed. Thus, the input/output module 132 may support a variety of different input techniques by recognizing and leveraging a division between types of inputs including key presses, gestures, control interaction, and so on.

The environment 100 further depicts that the computing device 102 may be communicatively coupled via a network 134 to a service provider 136, which enables the computing device 102 to access and interact with various resources 138 made available by the service provider 136. The resources 138 can include any suitable combination of content and/or services typically made available over a network by one or more service providers. For instance, content can include various combinations of text, video, ads, audio, multi-media streams, animations, images, webpages, and the like. Some examples of services include, but are not limited to, an online computing service (e.g., "cloud" computing), an authentication service, web-based applications, a file storage and collaboration service, a search service, messaging services such as email and/or instant messaging, and a social networking service.

Having described an example operating environment, consider now example details and techniques associated with one or more implementations of a sensor key for a keyset.

Keyset Fingerprint Sensor Key Examples

Example Devices and Sensor Key Arrangements

FIG. 2 depicts generally at 200 an example implementation of an input device 126 of FIG. 1 in greater detail. In the illustrated example, the input device 126 includes the keyset assembly 128, which may be configured in various ways as described in this document. The keyset assembly 128 may be configured to provide one or more keys (or other input control mechanisms) for various kinds of devices. Generally, the keyset assembly 128 provides an arrangement of physical buttons or "keys" that act as mechanical levers and/or electronic switches to supply input for a computing device. It is contemplated that the techniques described above and below may be employed with keyset assemblies that use various different technologies to implement and actuate keys. By way of example and not limitation, the keyset assembly 128 may utilize one or a combination of scissors switches, mechanical switches, dome switches, capacitive touch pads, hall effect detectors, and other types of mechanisms used for key travel and key press detection. The keyset assembly 128 is further designed to produce a tactile feel through mechanical structure and spring action of the keys, using a haptic response to key touches, or otherwise.

As depicted, the keyset assembly 128 includes a sensor key 202. The sensor key 202 represents a key located within the arrangement of keys that is configured to implement a fingerprint sensor 130 using the techniques described herein. Although a single sensor key 202 is represented, a keyset assembly 128 may include one or more keys in the form of a sensor key 202. The sensor key is shown as including a fingerprint sensor 130 and a backlight 204, which may be configured and operate in various ways as described above and below. The sensor key 202 may be a dedicated key that has a primary function to perform fingerprint sensing. In addition, or alternatively, the sensor key 202 may be configured as multifunctional key designed for use as a both a fingerprint sensor and as a key having other input function(s). For example, the sensor key 202 may be built into another key such as a letter key, a space bar, a logo or "home" key, or any other key traditionally included in a keyset assembly 128.

As noted, the techniques as described in this document may be used to implement various different types of keys and other input controls for various electronic devices. Some illustrative example devices and corresponding controls are represented in FIG. 2. For example, the keyset assembly 128 may be employed to implement a button or buttons for a mouse 206; keys or buttons associated with a mobile device 208, such as a mobile phone, tablet, camera, wearable device, or portable digital media player; keys within an arrangement of keys for a keyboard 210, and/or keys and controls provided by other input devices 126. Moreover, the described techniques may be employed with "keys" as well various other kinds of hardware controls and navigational input sensors including but not limited to capacitive buttons, trackpad devices, or capacitive sliders, directional control buttons, and the like.

Figure 3:
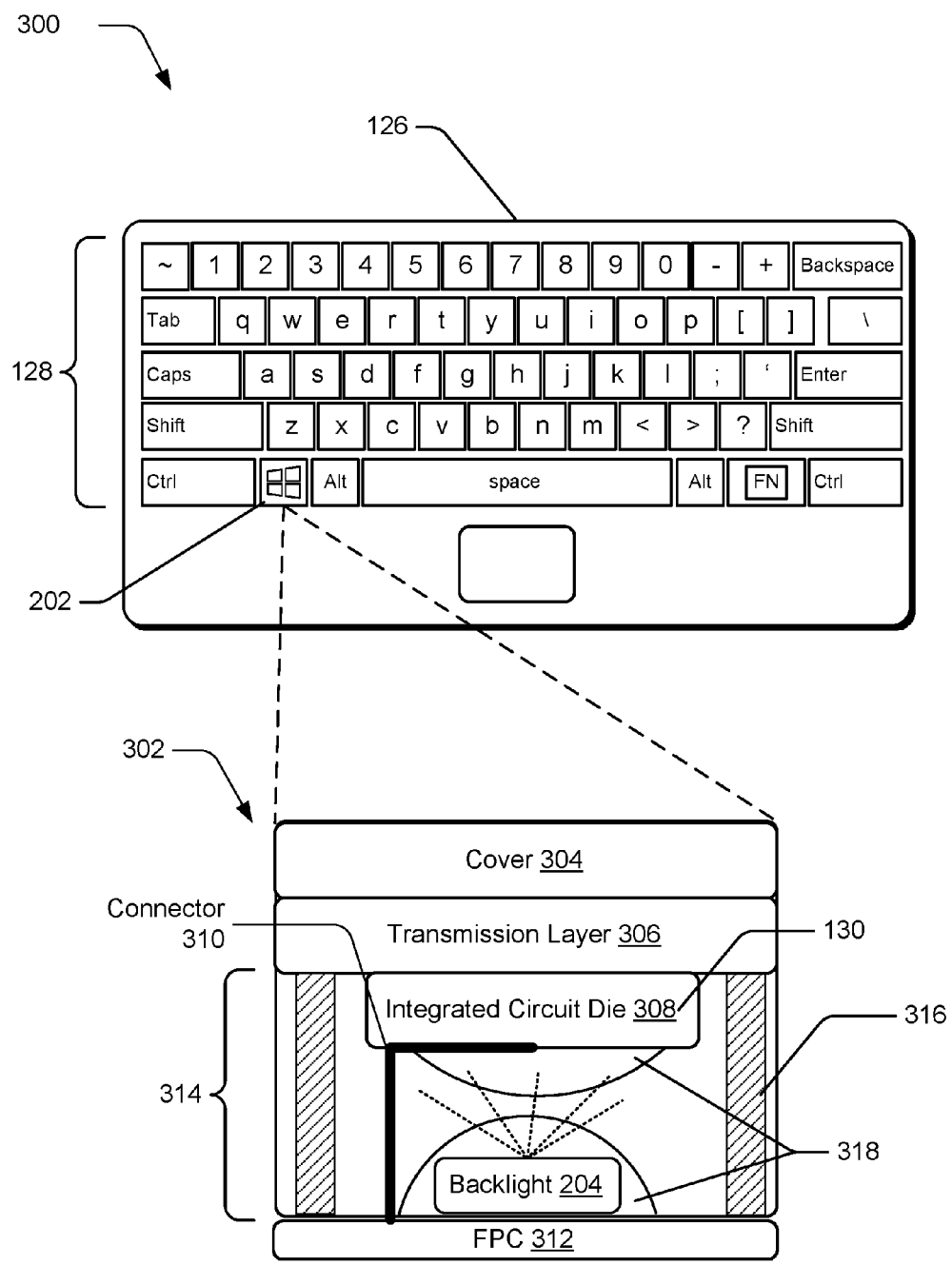
FIG. 3 depicts details of an example sensor key included in a keyset assembly for an input device in accordance with one or more implementations.

Example details and implementations of a sensor key are depicted and described in relation to FIGS. 3-8 below. In particular, FIG. 3 depicts generally at 300 details of a sensor key 202 included in a keyset assembly 128 for an input device 126 in accordance with one or more implementations. In this example, the input device 126 is a keyboard having a "qwerty" arrangement of keys, although other types of input devices and key arrangements are also contemplated. Additionally, the keyset assembly 128 includes a sensor key 202 within the arrangement of keys. For instance, the sensor key 202 is represented as being integrated into a logo or home key that is included in the key layout. The sensor key 202 may also be implemented by other keys such as the "f" key, the space bar, or the function key, to name a few examples. In this scenario, the sensor key 202 is a multifunction key designed to provide functionality for fingerprint sensing as well as other functions assigned to the key. The functionality provided by the key at any given time is selectively switched based on the current context. For instance, if a user is logging into the device or in the midst of a purchase transaction, the key operates for fingerprint sensing. On the other hand, during interaction with desktop applications to create or edit document, the key is switched to provide input functionality associated with the key (e.g., navigate home, insert letter or space, etc.). By combining the sensor key 202 with another key in this manner, the number of keys overall as well as the size of the input device is reduced, which reduces component cost and enables thin and sleek device designs.

FIG. 3 additionally depicts a cross-sectional view 302 of the sensor key 202 showing different components and layers employed to form the sensor key. In general, the sensor key 202 includes a cover 304, a transmission layer 306, and an integrated circuit die (IC die) 308 that together form a keycap for the sensor key.

The IC die 308 represents a block of semiconducting material upon which a functional circuit is fabricated. In accordance with techniques described herein, the IC die 308 includes functionality to implement a fingerprint sensor 130. The cover 304 is a surface layer for the key that is disposed "over-the-top" of the IC die 308. The cover 304 is typically formed as a plastic or composite layer that protects the key and includes key indications (letters, numbers, logos). The cover 304 may include painted and/or etched key indications. The cover 304 may also include patterns that are etched are otherwise formed into the cover 302, and which may be selectively illuminated by a backlight 204.

Typically, operation of the fingerprint sensor 130 degrades as the thickness of material above the sensor increases. Consequently, fingerprint sensors are traditionally exposed on the device surface or covered with minimal material between the sensor and the surface. For this reason, it may be difficult to provide backlight directly above the sensor. Implementations described herein, though, utilize relatively thin arrangements of a transmission layer 306 designed to transmit light to illuminate the cover while still allowing satisfactory performance of the fingerprint sensor 130. Using the transmission layer 306 enables the full surface area of the cover 304 to be illuminated, including portions of the cover directly above the sensor in the layers forming the sensor key 202.

In accordance with techniques described herein, the transmission layer 306 is disposed as a layer positioned in-between the cover 304 and the IC die 308. The transmission layer 306 is formed as a transparent or translucent layer that transmits light from the backlight 204 to the cover and through portions of the cover capable of emitting light (e.g., holes, etchings, thin regions, etc.). By way of example and not limitation, the transmission layer 306 may implemented as separate a clear plastic layer or an epoxy molding compound (EMC) layer used for packaging of the IC die 308. In this arrangement, light supplied by the backlight 204 passes through the transmission layer 306 for illumination of the cover 304.

The circuitry of the IC die 308 is physically and communicatively coupled by way of a connector 310 to a flexible printed circuit (FPC) 312 for the input device 126. The connector 310 may be implemented as a flex cable or other suitable connector to interconnect circuitry of the die with the FPC. The FPC 312 includes a matrix of conductive traces and circuitry operable to detect key presses and convert key presses into input signals for operation of the device. A wired or wireless connection of the input device 126 to the computing device is employed to convey the input signals for processing and handling by the input/output module 132, operating system, control logic of the input device, and/or other device functionality.

Here, the backlight 204 is represented as being implemented as a component of the FPC 312. The backlight 204 is shown as being positioned below the IC die 308 such that light from the backlight 204 is transmitted to the transmission layer around the sides of the die. Alternatively, the backlight 204 may be implemented as a component of the IC die 308 itself. Still further, the backlight 204 may be positioned as a separate device or integrated circuit device positioned alongside of the die and/or to one side of the transmission layer. In such positions, the backlight 204 supplies "side" lighting that is conveyed through the transmission layer. The backlight 204 is typically configured as a light emitting diode (LED) light, although other types of lights may be employed in some scenarios. Accordingly, the backlight 204 may be configured in various ways and as various types of lights without departing from the spirit of the techniques discussed herein.

In addition to the cover 304, transmission layer 306, and integrated circuit die (IC die) 308 that form the keycap, the sensor key includes a component layer 314 that includes various mechanisms for operations of the key. The component layer 314 is positioned generally between the keycap and the FPC 312 for the input device. Components included in the component layer 314 include various switches, contacts, support structures, and devices that enable the key to work. In the depicted example, the key is configured as a scissor key and therefore includes a scissor structure 316 represented by two hatched areas. The key is depicted as additionally including a pair of contact elements 318 that are spaced apart and come in contact when the key is depressed. When the contact elements come in contact, this closes a corresponding circuit and provide a mechanism to determine that the particular key has been pressed. Various other configurations of keys are contemplated, which may utilize different combinations of mechanisms including but not limited to scissor switches, mechanical switches, dome switches, capacitive touch pads, hall effect detectors, and other mechanism.

In operation, the backlight 204 is configured to selectively supply light at different times, in different colors, and/or in different sequences to illuminate the sensor key 202 and thereby provide indications indicative of sensing operations performed via the fingerprint sensor. Properties of the light that is provided by the backlight 204 may be adapted according to control logic implemented via the computing device 102 and/or a controller or fixed logic circuitry of the input device. In one approach, control circuitry of the input device 126 (e.g., logic for the key/light, or a controller or logic circuit for the input device) is operated under the influence of the operating system 108 to change the timing, color, and sequence of light emitted by the backlight 204 for different scenarios.

For example, the logo of the key represents a pattern that may be etched into, deposited in, molded or otherwise formed into the cover 304. The pattern may be formed using openings such as channels and holes that are etched into the cover. In addition or alternatively areas capable of emitting light passed through the transmission layer 306 may be formed by selectively locating material that transmits light in desired areas to form the pattern using masking, chemical depositing, etching, or other techniques.

In any case, the pattern (e.g., a logo, icon, key label, hole pattern) formed into the cover is designed to be illuminated with light supplied by the backlight. By way of example and not limitation, the pattern may be illuminated in different ways (as directed by the control logic) to convey indications regarding operational status of the fingerprint sensor (e.g., on, off, waiting), authentication status of a user, user identity, and/or availability of the fingerprint sensor in an application context (e.g., purchase transactions, authentication sequences, electronic document signing). The illuminating may also indicate different functions available for a multi-function key, such as illuminating a logo or key label white for "normal" key functions and illuminating the label green to indicate the key is available for fingerprint sensing. In another example, flashing may be used to indicate that fingerprint detection operations are in progress. In addition or alternatively, different colors may be employed to indicate that authentication using the fingerprint sensor is successful, that the authentication failed, and/or that the sensor is not working. In yet another example, different users may be associated with different colors and, upon successful authentication, the pattern of the sensor key 202 may be illuminated with a color corresponding to the authenticated/identified user.

In another example, the cover 304 may include multiple patterned portions (e.g., two or more labels, holes, logos, etc.) that may be illuminated separately using light from one or multiple different backlights. In this arrangement, different illuminable portions of the key may be selectively illuminated at different times and/or in different ways (e.g., different colors, and/or in different sequences) to convey the various kinds of indications discussed herein. For example, the cover may include both a key label and a fingerprint logo which may be illuminated at different times to convey available functionality to a user. In another example, a pattern of multiple pinholes may be used to represent different light combinations, color combinations, and sequences that correspond to different statuses, contexts, and functions. For example, multiple pinholes may be illuminated in a selected color at the same time to represent that the fingerprint sensor is ready. Then, the multiple pinholes may be illuminated in a circular or other pattern to indicate that fingerprint analysis and/or authentication is taking place. Upon authentication, one or more of the multiple pinholes may be illuminated in designated colors to indicate that authentication succeeded and/or identify the authentication user. Various other example pattern configurations and types of indications are also contemplated. Generally, the indications depend upon information regarding the context of interaction including the state of the fingerprint sensor, application being used, user identity, activity being engaged in by the user, and so forth.

As just described, the example of FIG. 3 generally shows different components and layers employed to form the sensor key 202. In this context, it is noted that various different implementations of the sensor key 202 are contemplated which follow the general concepts discussed in relation to the example of FIG. 3. In particular, a keycap portion of a sensor key 202 that is consistent with the principles discussed in relation may be configured in various ways. To illustrate, some representative example implementations of a keycap for the sensor key are now described in relation to FIGS. 4 to 8.

Figure 4:
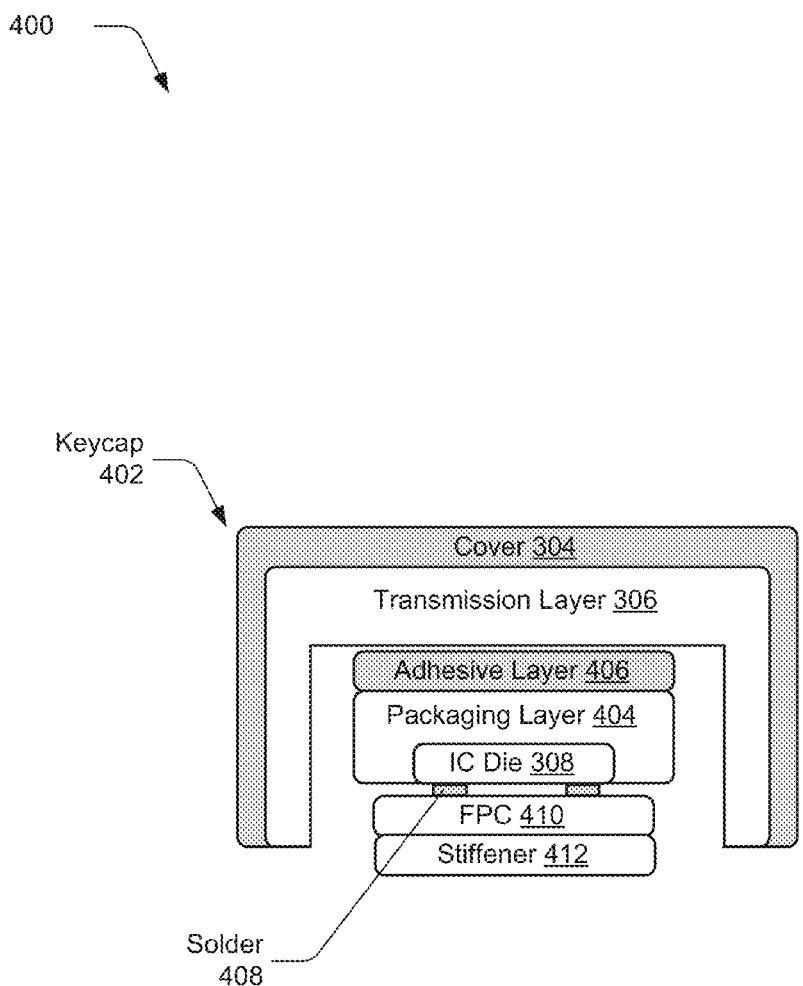
FIG. 4 depicts an example arrangement of a keycap in accordance with one or more implementations.

For instance, FIG. 4 depicts generally at 400 an example arrangement of a keycap 402 in accordance with one or more implementations. In this example, keycap 402 is formed using a transmission layer 306 that has a cover 304. The transmission layer 306 may be formed as a clear or translucent plastic structure. In implementations, the cover 304 is formed as a thin layer of opaque paint that is applied to the transmission layer 306. The cover 304 may also be a separate plastic or epoxy layer that is molded over or joined to the transmission layer 306.

For simple layered construction, an integrated circuit package including the IC die 308 and a packaging layer 404 in which the IC is embedded is adhered to the transmission layer 306 using an adhesive layer 406. The packaging layer 404 provides a protective package to protect the IC from damage and to facilitate handling and assembly. By way of example, the packaging layer 404 may be implemented as an epoxy molding compound (EMC) package designed to surround the IC die 308. Other types of packaging are also contemplated. The IC die 308 is additionally represented as being joined with solder 408 to a flexible printed circuit (FPC) 410 and a stiffener 412 that provides stability to the assembly.

The design represented in FIG. 4 enables a straightforward assembly process using adhesive that keeps costs down and uses common assembly techniques. The stack-up of layers above the IC die 308 has a thickness in a range of about 300 microns to 400 microns. The design is therefore viable for fingerprint sensors capable of achieving satisfactory detection and recognition through the noted thickness range.

Additional example designs discussed below result in less thickness of the stack-up of layers above IC die 308 relative to the example in FIG. 4. Generally, the reduction in thickness is achieved at the expense of some added complexity in the assembly processes. However, the reduced thickness designs may work well with a wider range of fingerprint sensors that have different tolerances for stack-up thickness. Thus, various design herein reflect tradeoffs between factors including assembly cost and complexity, sensor performance and tolerance, and stack-up thickness.

Figure 5:
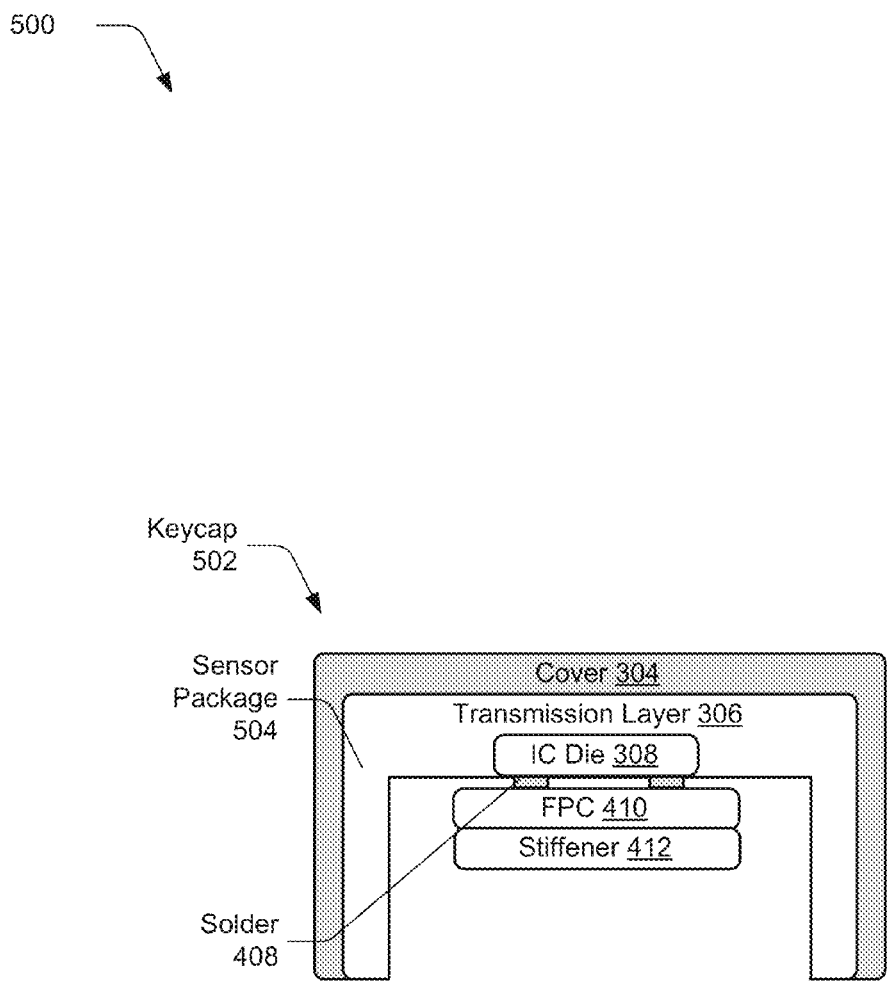
FIG. 5 depicts another example arrangement of a keycap in accordance with one or more implementations.

Referring to FIG. 5, another example arrangement of a keycap 502 in accordance with one or more implementations is depicted generally at 500. In this example, the keycap 502 is formed using the transmission layer 306 to act as a sensor package 504 for the IC die 308. In the sensor package 504, the transmission layer 306 is molded as a packaging layer around the IC die 308 including the fingerprint sensor 130. The sensor package 504 provides structure employed as a keycap for the sensor key 202. For example, the transmission layer 306 in the sensor package 504 may be a clear plastic or EMC protective layer that is molded around the IC die 308. The sensor package 504 is formed in the shape of the keycap 502 and then painted or otherwise joined to a cover layer to form the cover 304.

This approach of combining the transmission layer 306 and IC die 308 into a sensor package 504 as represented in FIG. 5 reduces material usage by eliminating the separate packaging layer 404 and adhesive layer 406. Additionally, a substantial reduction in thickness of the stack-up of layers above the IC die 308 is achieved. In particular, a thickness in a range of about 150 microns to 200 microns may be attained based on a cover layer having thickness of about 60 microns to 100 microns, and a packaging layer with thickness of 90 microns to 140 microns above the IC die 308. Consequently, the design is a viable option for a wider range of fingerprint sensors, include sensors that are too susceptible to thickness of the stack-up to work in the thickness range provided by the designed described in relation to FIG. 4.

Figure 6:
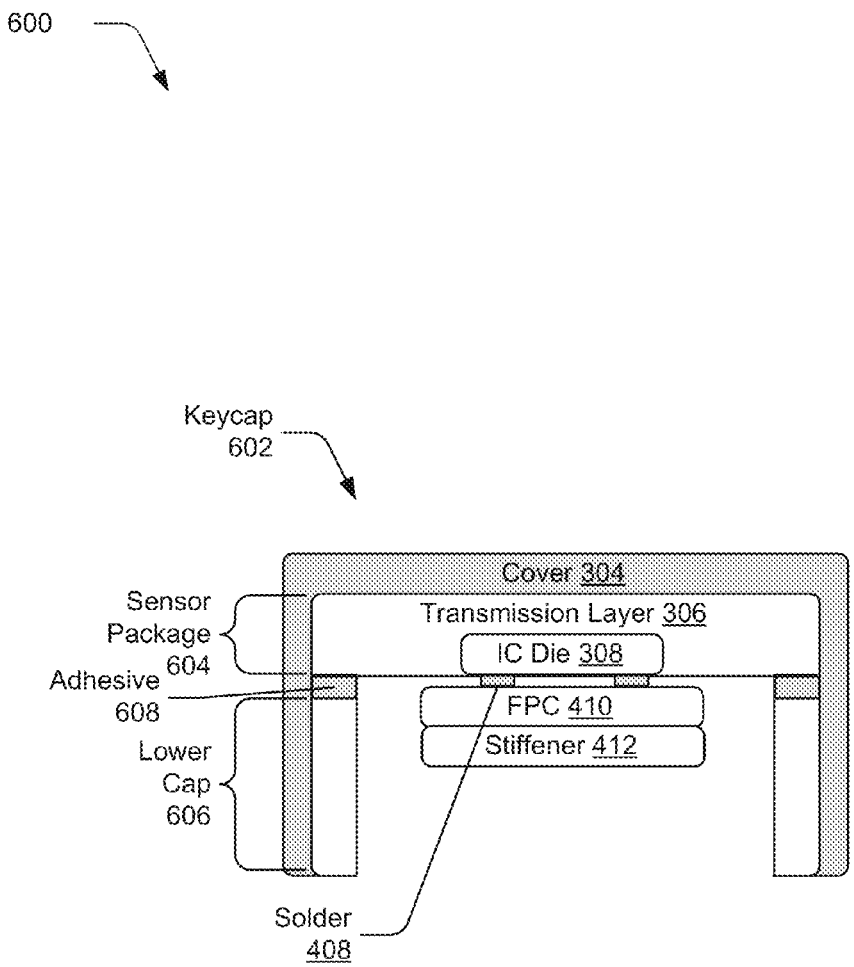
FIG. 6 depicts another example arrangement of a keycap in accordance with one or more implementations.

FIG. 6 depicts generally at 600 an additional example arrangement of a keycap 602 in accordance with one or more implementations. The design of the keycap 602 is similar to the example keycap 502 in that the transmission layer 306 and IC die 308 are again combined into a sensor package 604. The transmission layer 306 in the sensor package 604 may be a clear plastic or EMC protective layer that is molded around the IC die 308.

In the arrangement of FIG. 6 though, the keycap 602 structure is formed using two-part construction. In particular, an upper portion that includes the sensor package 604 is secured to a lower cap 606 portion using adhesive 608. Using the two-part construction simplifies the assembly process since the upper and lower portions of the keycap 602 may be formed as regular shaped solid objects. Manufacturing processes for joining and working with the regular shaped objects are also less complicated than processes for working with irregularly shaped objects.

For example, the sensor package 604 that makes up the upper portion is generally formed as a rectangular shaped solid (e.g., EMC molded over the die) and the lower cap 606 may be formed as one or more additional rectangular shaped solid portions that are joined to sensor package 604 using the adhesive 604. In implementations, the lower cap 606 is formed as a rectangular skirt having four walls and a cutout/open interior that provides space for components and structures of the key. Adhesive is placed where walls of the skirt meet the sensor package 604 to join the upper and lower portions together. The cover 306 is then formed by painting or otherwise adding a cover layer over the joined upper and lower portions.

The keycap 602 structure that is formed has roughly the same shape and dimensions as the example of keycap 502 of FIG. 5. For example, a thickness of between about 150 microns to 200 microns may be attained for the stack-up above the IC Die 308. Consequently, the design is another viable option for a wider range of fingerprint sensors, including sensors that are too susceptible to thickness of the stack-up to work in the thickness range provided by the designed described in relation to FIG. 4. In comparison to the arrangement of keycap 502 described in relation to FIG. 5, the cost and complexity of assembly for the keycap 602 may be reduced. On the other hand, the adhesive 608 produces an additional potential failure point that could adversely impact reliability. Generally, an assessment regarding tradeoffs between cost, complexity of assembly, sensor performance and reliability may be a factor is selecting between the different keycap arrangements described herein.

Figure 7:
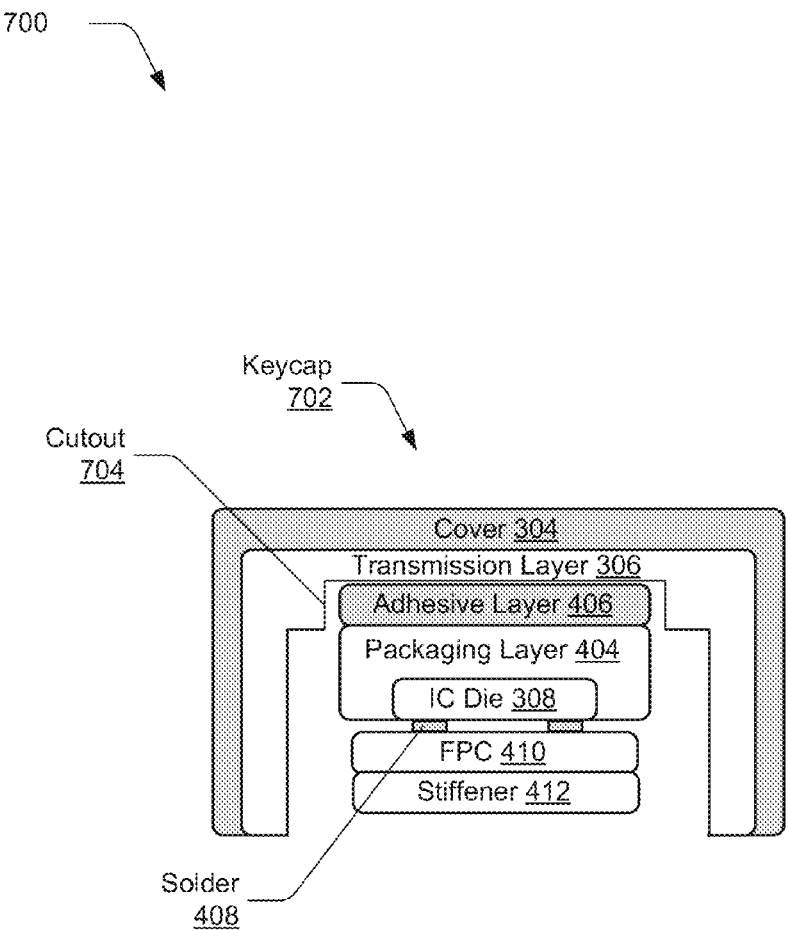
FIG. 7 depicts another example arrangement of a keycap in accordance with one or more implementations.

FIG. 7 depicts generally at 700 an additional example arrangement of a keycap 702 in accordance with one or more implementations. The design of the keycap 702 uses layers that are similar to the example keycap 402 described in relation to FIG. 4. For instance, an integrated circuit package including the IC die 308 and a packaging layer 404 in which the IC is embedded is adhered to the transmission layer 306 using an adhesive layer 406. In arrangement of FIG. 7, though, transmission layer 306 is configured to include a cutout 704 that is designed to receive the integrated circuit package in which the fingerprint sensor is embedded. The cutout 704 may be formed in various ways such as by creating the shape in a mold, etching or cutting the shape into the transmission layer 306, masking techniques, and so forth.

In comparison to the example keycap 402 of FIG. 4, using the cutout 702 reduces the thickness of the stack-up above the IC die 308 to a range of about 250 microns to 300 microns. As noted, the reduced thickness for the keycap 702 may improve performance of fingerprint sensors relative to the keycap 402. On the other hand, the assembly process is more complex and potentially costlier since the process involves forming of the cutout 702. Again, an assessment of tradeoffs between cost, complexity of assembly, sensor performance, and reliability may be made to select a keycap design from among the various different arrangements of keycaps discussed in this document.

Figure 8:
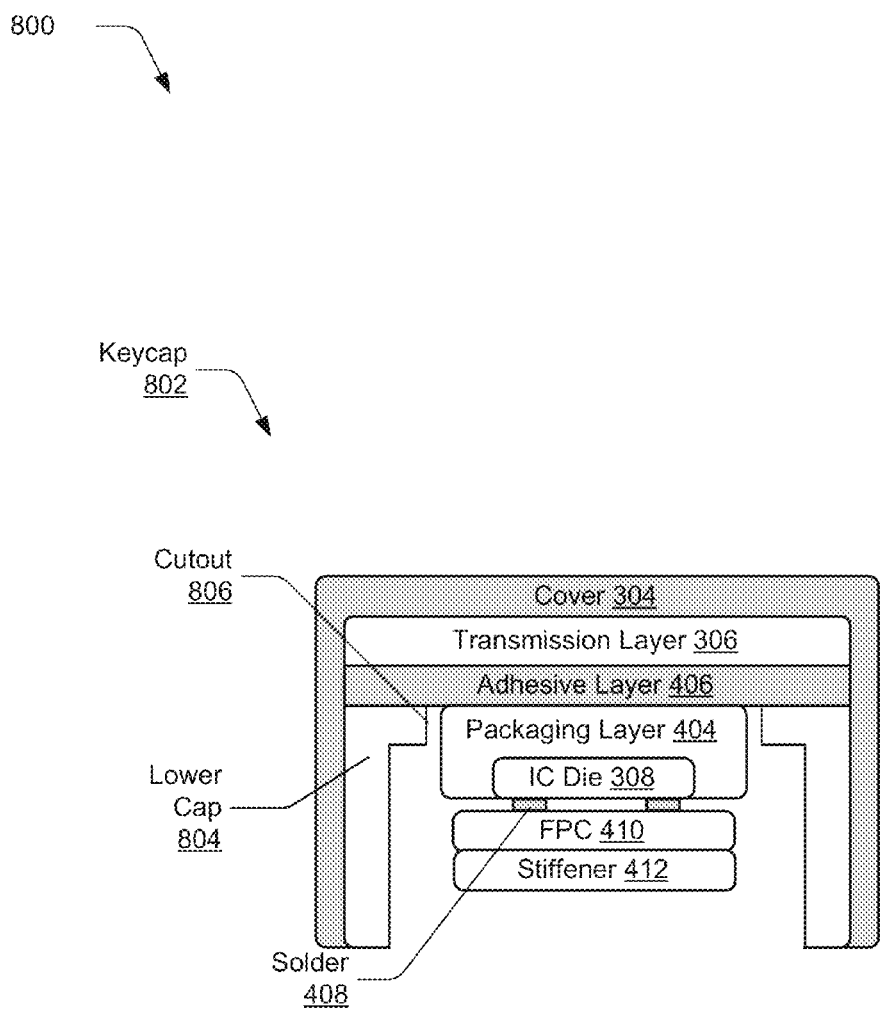
FIG. 8 depicts another example arrangement of a keycap in accordance with one or more implementations.

FIG. 8 depicts generally at 800 an additional example arrangement of a keycap 802 in accordance with one or more implementations. The design of keycap 802 combines elements of the example keycap 702 that employs a cutout and the example keycap 602 that uses a two-part construction with upper and lower portions. For instance, the keycap 802 includes the transmission layer 306 as the upper portion. The transmission layer 306 is joined to a lower cap 804 of the keycap 802 using via adhesive layer 406. The lower cap 804 includes a cutout 806 designed to receive the integrated circuit package including the IC die 308 and the packaging layer 404. Similar to the example keycap 702, using the cutout 806 for the arrangement of keycap 802 reduces the thickness of the stack-up above the IC die 308 to a range of about 250 microns to 300 microns.

As noted, a keycap portion of a sensor key 202 may be configured in various ways as represented by the example keycaps just described in relation to FIGS. 4 to 8. Various different keycap options may be used in the context of the sensor key design(s) described in relation to FIG. 3. Accordingly, a backlight 204 may be positioned to supply light for illuminating the sensor key 202. Additionally, covers of the different keycap options may be configured to include patterns that may be selectively illuminated via the backlight 204. Illumination of the cover patterns at different times, in different colors, and/or in different sequences provides a mechanism to convey indications indicative of sensing operations performed via the fingerprint sensor as described herein. The sensor key 202 having various different configurations is included as a key within an arrangement of keys provided by a keyset for an input device 126. Additional examples and details are disused in relation the following example procedures.

Example Procedures

To further illustrate, consider the discussion in this section of example procedures and implementation details related to keyset fingerprint sensors with backlight. The procedures described in this document may be implemented utilizing the environment, system, devices, and components described herein and in connection with any suitable hardware, software, firmware, or combination thereof. The procedures may be represented as a set of blocks that specify operations performed by one or more entities and are not necessarily limited to the orders shown for performing the operations by the respective blocks.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

FIG. 9 depicts an example procedure 900 for assembly of an input device having a sensor key in accordance with one or more implementations. A sensor key for inclusion within an arrangement of keys is formed (block 902). In accordance with principles discussed herein, the sensor key includes a transmission layer covering a fingerprint sensor, a patterned cover disposed over the transmission layer and the fingerprint sensor, and a backlight configured to transmit light through the transmission layer to the patterned cover. For example, a sensor key 202 as discussed herein may be formed in various ways. The sensor key 202 may be configured with various different types of keycaps in accordance with the foregoing examples. The sensor key 202 additionally includes a backlight 204, such as an LED, positioned to illuminate a cover of the key. The cover may include various patterns that may be selectively illuminated via the backlight 204 in the manner described herein.

An input device is assembled to include the sensor key within the arrangement of keys and control logic operable to selectively operate the backlight to provide different indications regarding operational status of the fingerprint sensor by selectively changing light that is emitted via the patterned cover (block 904). For example, various types of input devices 126 may employ sensor keys 202 in accordance with the techniques and examples described previously. As also described in the foregoing description, control logic associated with the input device may operate to selectively change the properties of light emitted by the backlight 204 in different scenarios. Varying the timing, color, sequence, and other properties of the light provides a mechanism to provide indications indicative of sensing operations performed via the fingerprint sensor, examples of which are discussed throughout this document.

FIG. 10 depicts an example procedure 1000 for operation of a sensor key in accordance with one or more implementations. A status is detected for a fingerprint sensor of a sensor key included within a keyset for an input device, the sensor key including a cover pattern that is illuminable by a backlight (block 1002). For example, sensor keys 202 as described herein may be integrated with keysets for input devices as previously noted. The sensor key 202 includes a fingerprint sensor 130 operable to perform operations to recognize fingerprints and take corresponding actions to identify a user, control access to devices and content, initiate authentication sequences and so forth. In this context, control logic associated with the sensor key 202, an input device 126, and/or a computing device is configured to determine status information regarding the fingerprint sensor 130. Status information may include information regarding operational status of the sensor (e.g., on, off, waiting), authentication status of a user, user identity, and/or availability of the fingerprint sensor in an application context (e.g., purchase transactions, authentication sequences, electronic document signing). The status detected for the sensor key 202 is used to select and control indications that are provide regarding the status.

In particular, operation of the backlight is directed to supply light indicative of the detected status of the fingerprint sensor to illuminate the cover pattern (block 1004). In other words, the backlight is operated in dependence upon the status to provide corresponding indications via patterns formed into the cover of the sensor key 202. Different indications may be directed for different statuses by specifying variations for properties of the light supplied by the backlight including but not limited to one or more of the timing, color, and/or sequence of the light. In implementations, a data structure such as a file, table, database, or fixed logic may be configured to map different statuses to properties of light and/or control instructions used to indicate the status. The data structure is used to look-up properties and instructions that match a detected status. Then, the control logic associated with the sensor key 202 communicates control signals to cause the backlight to illuminate the cover pattern to reflect the detected status as specified by the data structure.

Having considered example details and procedures for keyset fingerprint sensors with backlight, consider a discussion of an example system in accordance with one or more implementations.

Example System and Device

Figure 11:
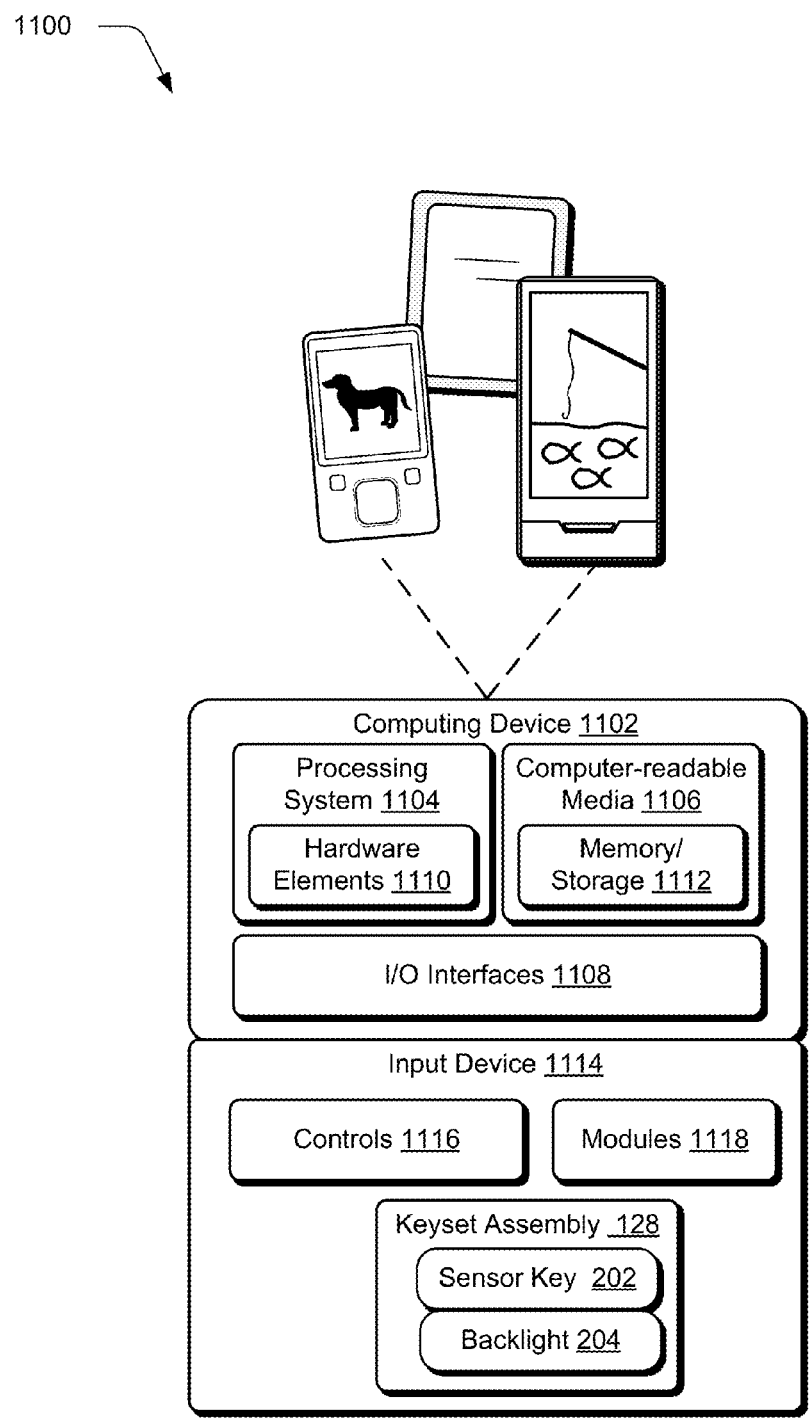
FIG. 11 illustrates an example system that includes an example computing device that is representative of one or more computing systems and/or devices that may implement the various techniques described herein.

FIG. 11 illustrates an example system generally at 1100 that includes an example computing device 1102 that is representative of one or more computing systems and/or devices that may implement the various techniques described herein. The computing device 1102 may be, for example, be configured to assume a mobile configuration through use of a housing formed and size to be grasped and carried by one or more hands of a user, illustrated examples of which include a mobile phone, mobile game and music device, and tablet computer although other examples are also contemplated.

The example computing device 1102 as illustrated includes a processing system 1104, one or more computer-readable media 1106, and one or more I/O interface 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware element 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

Input/output interface(s) 1108 are representative of functionality to allow a user to enter commands and information to computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways to support user interaction.

The computing device 1102 is further illustrated as being communicatively and physically coupled to an input device 1114 that is physically and communicatively removable from the computing device 1102. In this way, a variety of different input devices may be coupled to the computing device 1102 having a wide variety of configurations to support a wide variety of functionality. In this example, the input device 1114 includes one or more controls 1116. The controls may be configured as pressure sensitive elements, buttons, a trackpad mechanically switched keys, and so forth.

The input device 1114 is further illustrated as include one or more modules 818 that may be configured to support a variety of functionality. The one or more modules 1118, for instance, may be configured to process analog and/or digital signals received from the controls 1116 to recognize inputs and gesture, determine whether an input is indicative of resting pressure, initiate communication with a computing device, support authentication of the input device 814 for operation with the computing device 1102, and so on. The input device 1114 may also be configured to incorporate a keyset assembly 128 that includes a sensor key 202 and backlight 204 as previously described.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refers to media and/or devices that enable persistent storage of information in contrast to mere signal transmission, carrier waves, or signals per se. Thus, computer-readable storage media does not include transitory media or signals per se. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or hardware elements 1110 of the processing system 1104. The instructions and/or functions may be executable/operable by one or more articles of manufacture (for example, one or more computing devices 802 and/or processing systems 804) to implement techniques, modules, and examples described herein.

EXAMPLE IMPLEMENTATIONS

Example implementations of techniques described herein include, but are not limited to, one or any combinations of one or more of the following examples:

Example 1

An input device comprising: a keyset assembly including an arrangement of keys; and a sensor key included as a key within the arrangement of keys including: a fingerprint sensor for fingerprint recognition; a transmission layer configured to transmit light disposed over the fingerprint sensor; a patterned cover disposed over the transmission layer and the fingerprint sensor, and a backlight positioned to transmit light through the transmission layer to illuminate a pattern of the patterned cover and thereby provide indications indicative of a status of the fingerprint sensor.

Example 2

An input device as described in any one or more of the examples in this section, further comprising: control logic operable to selectively operate the backlight to provide different indications regarding the status of the fingerprint sensor by selectively changing light that is emitted via the patterned cover.

Example 3

An input device as described in any one or more of the examples in this section, wherein the control logic is configured to: detect the status of the fingerprint sensor; and direct operation of the backlight to supply light indicative of the detected status to illuminate the pattern of the patterned cover.

Example 4

An input device as described in any one or more of the examples in this section, wherein the status of the fingerprint sensor reflects information regarding at least one of an operational status of the sensor, authentication status of a user, user identity, or availability of the fingerprint sensor in an application context.

Example 5

An input device as described in any one or more of the examples in this section, wherein the backlight is configured to indicate multiple different statuses by selectively changing properties of light that is emitted via the patterned cover for the multiple different statuses.

Example 6

An input device as described in any one or more of the examples in this section, wherein the fingerprint sensor is implemented via an integrated circuit die that is adhered with adhesive to the transmission layer.

Example 7

An input device as described in any one or more of the examples in this section, wherein the fingerprint sensor is implemented via a sensor package in which the transmission layer is molded as a packaging layer around an integrated circuit die including the fingerprint sensor, the sensor package providing structure employed as a keycap for the sensor key.

Example 8

An input device as described in any one or more of the examples in this section, wherein: the fingerprint sensor is implemented via a sensor package in which the transmission layer is molded as a packaging layer around an integrated circuit die including the fingerprint sensor; and a keycap for the sensor key is formed by securing the sensor package as an upper portion of the keycap to a lower cap portion using adhesive.

Example 9

An input device as described in any one or more of the examples in this section, wherein: the transmission layer is configured to include a cutout designed to receive an integrated circuit package in which the fingerprint sensor is embedded; and the integrated circuit package is positioned within the cutout and joined to the transmission layer using adhesive.

Example 10

An input device as described in any one or more of the examples in this section, wherein the patterned cover comprises a layer of opaque paint that is applied to the transmission layer and etched to form the pattern.

Example 11

An input device as described in any one or more of the examples in this section, wherein the backlight comprises a light emitting diode (LED) that is positioned underneath an integrated circuit die including the fingerprint sensor such that light from the backlight is transmitted to the transmission layer around sides of the integrated circuit die.

Example 12

An input device as described in any one or more of the examples in this section, wherein the backlight is included as a component of an integrated circuit die that implements the fingerprint sensor.

Example 13

An input device as described in any one or more of the examples in this section, wherein the sensor key is configured as multifunctional key designed for use as a both a fingerprint sensor and as a key having other input functions.

Example 14

An input device as described in any one or more of the examples in this section, wherein the input device comprises a keyboard device having a plurality of keys operable to generate input signals for operation of a computing device.

Example 15

A sensor key included as a key within an arrangement of keys for an input device comprising: a sensor package in which a transmission layer of material configured to transmit light is formed as a packaging layer around an integrated circuit die implementing a fingerprint sensor for fingerprint recognition, the sensor package providing structure employed as a keycap for the sensor key; a patterned cover disposed over the sensor package; and a backlight positioned to transmit light through the transmission layer of the sensor package to illuminate a pattern of the patterned cover, the backlight operable to provide different indications corresponding to different statuses of the fingerprint sensor by selectively changing light that is emitted via the patterned cover.

Example 16

A sensor key as described in any one or more of the examples in this section, wherein thickness of material above the integrated circuit die implementing the fingerprint sensor is in a range of 150 microns to 200 microns.

Example 17

A sensor key as described in any one or more of the examples in this section, wherein the transmission layer is an epoxy molding compound (EMC) protective layer that is molded around the integrated circuit die.

Example 18

A method comprising: detecting status of a fingerprint sensor of a sensor key included within a keyset for an input device, the sensor key including a cover pattern that is illuminable by a backlight; and directing operation of the backlight to supply light indicative of the detected status of the fingerprint sensor to illuminate the cover pattern.

Example 19

The method as described in any one or more of the examples in this section, wherein different indications are directed for different statuses by specifying variations for properties of the light supplied by the backlight.

Example 20

The method as described in any one or more of the examples in this section, wherein directing operation of the backlight comprises: looking-up properties and instructions that match a detected status in a data structure configured to map different statuses to properties and instructions used to indicate the status; and communicating control signals to cause the backlight to illuminate the cover pattern to reflect the detected status as specified by the data structure.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An input device comprising:
a keyset assembly including an arrangement of keys;
a sensor key included as a key within the arrangement of keys including:
  a fingerprint sensor for fingerprint recognition;
  a transmission layer configured to transmit light disposed over the fingerprint sensor;
  a patterned cover disposed over the transmission layer and the fingerprint sensor, and
  a backlight positioned to transmit light through the transmission layer to illuminate a pattern of the patterned cover and thereby provide indications indicative of a status of the fingerprint sensor; and
control logic operable to selectively operate the backlight to provide different indications regarding the status of the fingerprint sensor by selectively changing light that is emitted via the patterned cover.

2. An input device as described in claim 1, wherein the control logic is configured to:
detect the status of the fingerprint sensor; and
direct operation of the backlight to supply light indicative of the detected status to illuminate the pattern of the patterned cover.

3. An input device as described in claim 1, wherein the status of the fingerprint sensor reflects information regarding at least one of an operational status of the sensor, authentication status of a user, user identity, or availability of the fingerprint sensor in an application context.

4. An input device as described in claim 1, wherein the backlight is configured to indicate multiple different statuses by selectively changing properties of light that is emitted via the patterned cover for the multiple different statuses.

5. An input device as described in claim 1, wherein the fingerprint sensor is implemented via an integrated circuit die that is adhered with adhesive to the transmission layer.

6. An input device as described in claim 1, wherein the fingerprint sensor is implemented via a sensor package in which the transmission layer is molded as a packaging layer around an integrated circuit die including the fingerprint sensor, the sensor package providing structure employed as a keycap for the sensor key.

7. An input device as described in claim 1, wherein:
the fingerprint sensor is implemented via a sensor package in which the transmission layer is molded as a packaging layer around an integrated circuit die including the fingerprint sensor; and
a keycap for the sensor key is formed by securing the sensor package as an upper portion of the keycap to a lower cap portion using adhesive.

8. An input device as described in claim 1, wherein:
the transmission layer is configured to include a cutout designed to receive an integrated circuit package in which the fingerprint sensor is embedded; and
the integrated circuit package is positioned within the cutout and joined to the transmission layer using adhesive.

9. An input device as described in claim 1, wherein the patterned cover comprises a layer of opaque paint that is applied to the transmission layer and etched to form the pattern.

10. An input device as described in claim 1, wherein the backlight comprises a light emitting diode (LED) that is positioned underneath an integrated circuit die including the fingerprint sensor such that light from the backlight is transmitted to the transmission layer around sides of the integrated circuit die.

11. An input device as described in claim 1, wherein the backlight is included as a component of an integrated circuit die that implements the fingerprint sensor.

12. An input device as described in claim 1, wherein the sensor key is configured as multifunctional key designed for use as a both a fingerprint sensor and as a key having other input functions.

13. An input device as described in claim 1, wherein the input device comprises a keyboard device having a plurality of keys operable to generate input signals for operation of a computing device.

14. A sensor key for an input device comprising:
a sensor package in which a transmission layer of material configured to transmit light is formed as a packaging layer around an integrated circuit die implementing a fingerprint sensor for fingerprint recognition, the sensor package providing structure employed as a keycap for the sensor key;
a patterned cover disposed over the sensor package; and
a backlight positioned to transmit light through the transmission layer of the sensor package to illuminate a pattern of the patterned cover, the backlight operable to provide different indications corresponding to different statuses of the fingerprint sensor by selectively changing light that is emitted via the patterned cover.

15. A sensor key as described in claim 14, wherein thickness of material above the integrated circuit die implementing the fingerprint sensor is in a range of 150 microns to 200 microns.

16. A sensor key as described in claim 14, wherein the transmission layer is an epoxy molding compound (EMC) protective layer that is molded around the integrated circuit die.

17. A method comprising:
detecting different indications of status of a fingerprint sensor of a sensor key included within a keyset for an input device, the sensor key including a cover pattern that is illuminable by a backlight; and
directing operation of the backlight to selectively change light that is emitted by the cover pattern based on the different indications of status of the fingerprint sensor.

18. The method as described in claim 17, wherein different indications are directed for different statuses by specifying variations for properties of the light supplied by the backlight.

19. The method as described in claim 17, wherein directing operation of the backlight comprises:
looking-up properties and instructions that match a detected status in a data structure configured to map different statuses to properties and instructions used to indicate the status; and
communicating control signals to cause the backlight to illuminate the cover pattern to reflect the detected status as specified by the data structure.

20. The method as described in claim 17, wherein said detecting comprises detecting one or more of an operational status of the fingerprint sensor, authentication status of a user, user identity, or availability of the fingerprint sensor in an application context.

* * * * *